April 19, 1955 J. R. HOLLINS 2,706,807
AUTOMOTIVE SIGNALLING CIRCUITS AND SWITCH THEREFOR
Filed July 12, 1951 2 Sheets-Sheet 1

INVENTOR.
Jesse R. Hollins
BY
ATTORNEY

April 19, 1955  J. R. HOLLINS  2,706,807
AUTOMOTIVE SIGNALLING CIRCUITS AND SWITCH THEREFOR
Filed July 12, 1951
2 Sheets-Sheet 2
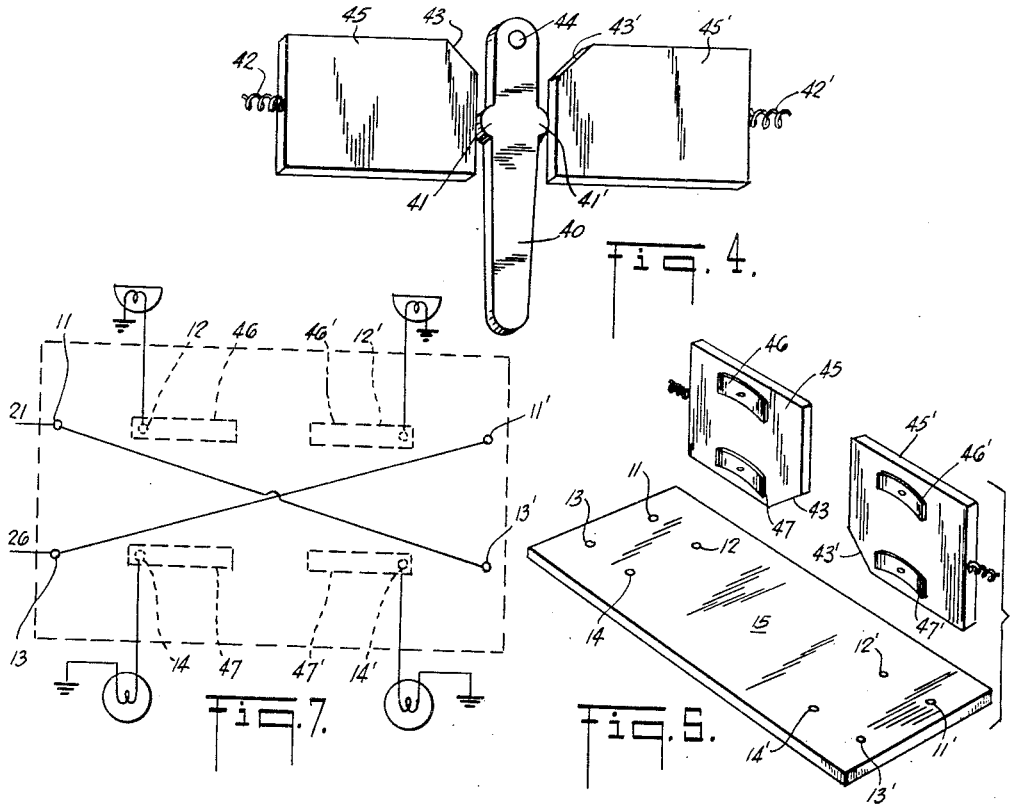
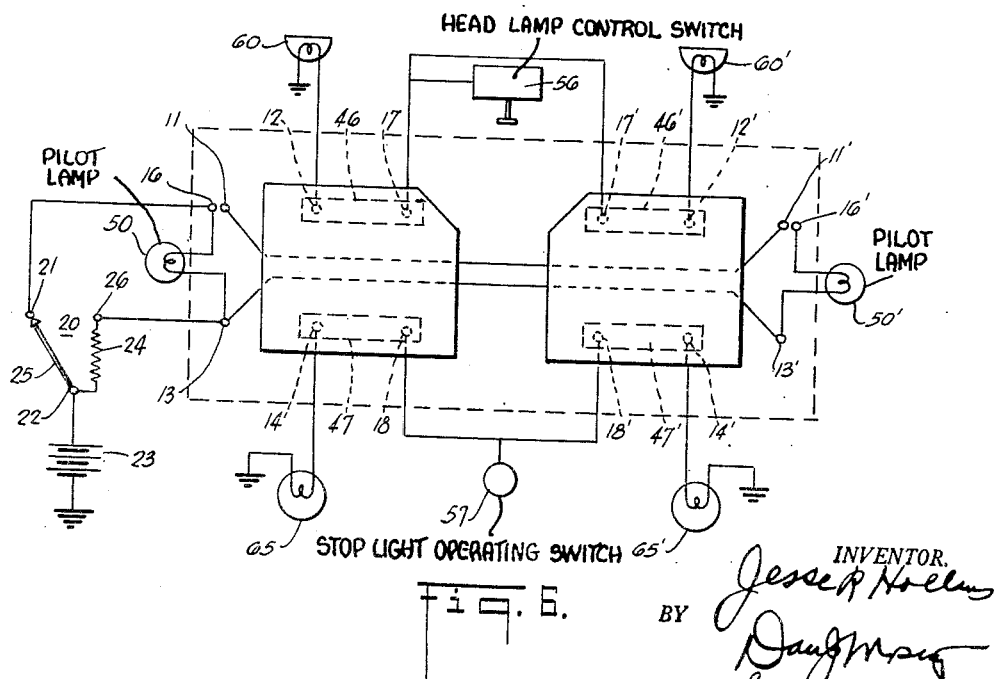
INVENTOR.
Jesse R Hollins
BY
his ATTORNEY

United States Patent Office 2,706,807
Patented Apr. 19, 1955

2,706,807
AUTOMOTIVE SIGNALLING CIRCUITS AND SWITCH THEREFOR

Jesse R. Hollins, Brooklyn, N. Y.

Application July 12, 1951, Serial No. 236,395

10 Claims. (Cl. 340—81)

This invention relates to signal lamp circuits for motor vehicles and, more particularly, to a novel directional signalling switch in combination with novel signal lamp and flasher circuits.

Modern motor vehicles are equipped with two pairs of lamps for signalling changes in direction, one pair being mounted on either side of the front of the vehicle and the other pair on either side of the rear of the vehicle. A selector switch is provided to selectively energize both left lamps or both right lamps, preferably in circuit with a flasher to "flash" the selectively illuminated lamps.

The flasher generally includes a resistance wire which is always in circuit and which is periodically shunted by operation of a movable switch arm responsive to heating of the resistance wire. This arm makes alternate contacts with two terminals. When the resistance wire is not shunted, its high resistance prevents any effective current flow to the signal lamps, so that the lamps are energized only when the resistance wire is shunted by the movable flasher arm. When the latter shunts the resistance wire, the wire cools and the flasher arm disengages the shunting contact.

In most present signalling arrangements, a swinging arm is provided on the selector switch to selectively connect either the left or right lamps to the flasher. As the resistance wire takes some time to heat, the lamps are not immediately illuminated. Furthermore, both left lamps or both right lamps draw their full current supply through the flasher arm simultaneously.

In accordance with the present invention, a novel simplified selector switch is provided comprising a base having a pair of slides and a pivoted operating lever mounted thereon. The slides are on either side of the lever and spring biased into engagement therewith. Each slide carries a pair of contact strips elongated in the direction of slide movement.

The switch base carries four pairs of terminals, two associated with each slide. The two intermediate sets of terminals are respectively connected to the four signal lamps, the left set being connected to the left lamps and the right set to the right lamps. One terminal of each intermediate set is connected to a front lamp and the other to a rear lamp.

The two outer sets of terminals are connected through a flasher to a potential source such as the vehicle battery or generator. In the normal inwardly biased position of the slides, the contact strips engage only the intermediate terminals. When either slide is moved outwardly, its contact strips connect its associated inner terminals to the outer terminals to illuminate the desired pair of lamps through the flasher.

In accordance with the invention, the "rear" terminal of each outer set is connected to the shunting contact of the flasher, and the "front" contact is connected to the normally dead or unused contact of the flasher, this contact being the one engaged by the flasher arm when the resistance wire is cold. Thus, one of the selected lamp pair is illuminated immediately. As the flasher resistance heats, the arm is swung to disengage the "dead" contact and engage the shunt contact. This extinguishes the previously illuminated lamp and illuminates the other lamp of the pair. It will be noted that only one lamp at a time draws its current through the flasher arm.

A pilot lamp is connected across one pair of outer terminals, thus being illuminated each time the flasher arm engages one of the flasher contacts, the "flashing" of the pilot lamp being at twice the frequency of flashing of the signal lamps. If one signal lamp burns out, the pilot lamp flashes at only half its regular rate, and it does not flash at all when both lamps burn out.

Alternatively, a pair of pilot lamps may be provided, one on each side of the switch. Each pilot lamp has one terminal connected to an outer terminal of the switch, with the other pilot lamp terminal connected to an auxiliary contact spaced from but adjacent the other outer terminal. When either slide is moved outwardly, its contact strip electrically connects this auxiliary terminal to the adjacent outer terminal. Thus, one or the other of the pilot lamps is selectively energized in accordance with the selective operation of the switch.

By the addition of a longitudinally movable cam slide to the switch, both slides may be moved simultaneously to flash all the signal lamps at once. As a further feature, the parking and stop lamps of the vehicle may be used for signal lamps by the addition of two pairs of terminals to the switch base, the slide contact strips, in the off position of the switch, connecting the parking and stop lamps in circuit for normal operation.

For an understanding of the invention principles, reference is made to the following detailed description of typical embodiments thereof as illustrated in the accompanying drawings. In the drawings:

Fig. 4 is a perspective view of the switch operating handle and slides;

Fig. 5 is a perspective view of the two slides and the switch base;

Fig. 6 is a schematic wiring diagram of the invention circuit and switch as arranged to utilize the parking and stop lamps for signalling, and illustrating the two pilot lamp arrangement; and Fig. 7 is a schematic wiring diagram of the switch base and terminals illustrating a terminal connection arrangement for sequentially flashing all the signal lamps.

Figure 1:
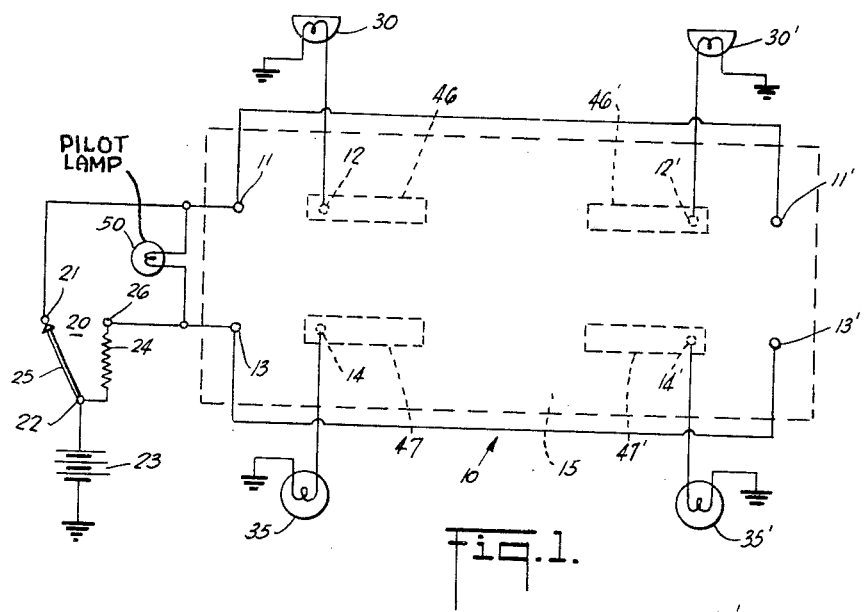
Fig. 1 is a schematic wiring diagram of a signal lamp circuit including the invention switch, only the base and terminals of the latter being shown.
Figure 2:
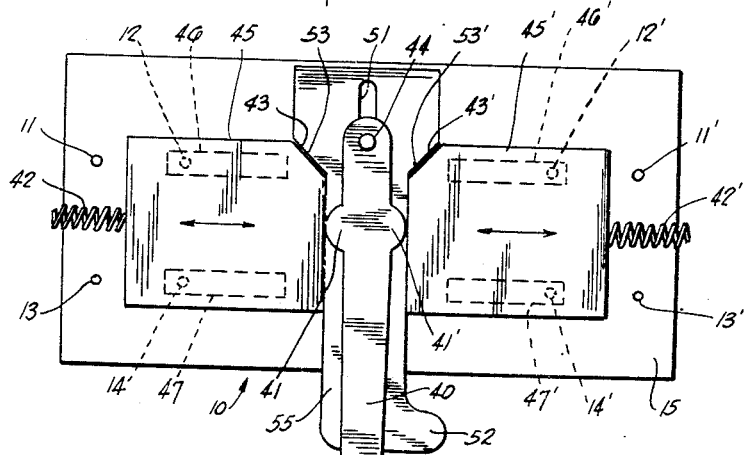
Fig. 2 is a plan view of one form of the switch.

Referring to Figs. 1 and 2, the switch 10 of the invention is shown as including a base 15 having terminals 11—14 and 11'—14' mounted thereon. First or outer terminals 11 and 11' are connected to the "dead" contact 21 of a flasher 20 having a live contact 22 connected to the live terminal of a grounded battery 23. A resistance heating wire 24, of "Nichrome" or the like, is connected between live contact 22 and shunt contact 26. The latter is connected to first or outer terminals 13 and 13'. Terminals 11 and 13 constitute a first pair of terminals, as do also terminals 11' and 13'.

Flasher 20 includes a movable arm 25 arranged to connect contact 22 alternately to contacts 21 and 26. Normally, arm 25 engages dead contact 21 but, when wire 24 heats up and expands due to current flow therethrough, arm 25 swings over to engage shunt contact 26. As the shunted resistance 24 cools and contracts, arm 25 swings back to engage contact 21. With the arrangement shown, "front" terminal 11 and "rear" terminal 13 are alternately connected to battery 23.

Second or inner terminals 12 and 12' are respectively connected to grounded left and right front signal lamps 30 and 30'. Second or inner terminals 14 and 14' are respectively connected to grounded left and right rear signal lamps 35 and 35'. Terminals 12 and 14 constitute a second pair of terminals as do also terminals 12' and 14'.

An operating lever 40 is swingably mounted on base 15 and has abutments 41, 41' respectively engaging slides 45, 45' biased toward the abutments by springs 42, 42'. For a purpose to be described the "front" inner corners 43, 43' of the slides are chamfered.

Slide 45 carries contact strips 46, 47 on its under surface, and slide 45' has similar contact strips 46', 47'. Strip 46 is aligned with terminals 11, 12, and strip 47 is aligned with terminals 13, 14. Strips 46' and 47' are correspondingly arranged. In the off position of the switch 10, the contact strips engage only terminals 12, 12' and 14, 14'.

Assuming that it is desired to signal a left turn, lever 40 is swung clockwise to move slide 45 to the left. Contact strip 46 interconnects terminals 11 and 12, and strip 47 connects terminal 13 to terminal 14. As flasher arm 25 is engaged with contact 21, left front lamp 30 is illuminated. The resistance 24 is of such value that the current flow therethrough is insufficient to illuminate left rear lamp 35. As wire 24 is heated and expands, arm 25 is swung to engage contact 26, shunting the resistance. Lamp 30 is extinguished and lamp 35 is illuminated. As the resistance 24 cools and contracts, arm 25 again engages contact 21, and the foregoing cycle is repeated. Thus lamps 30 and 35 are flashed alternately, and only one lamp at a time draws current through the flasher arm 25. Furthermore, lamp 30 is energized immediately switch 10 is operated, without the usual delay for the flasher resistance to heat up.

A pilot lamp 50 is connected across terminals 11 and 13. When arm 25 engages contact 21, lamp 30 is connected to ground through unlighted lamp 35. As the pilot lamp has a high resistance while the signal lamps have a low resistance, lamp 50 will light but lamp 35 will not. When arm 25 swings to engage contact 26, lamp 50 is grounded through lamp 30. Thus lamp 50 flashes twice as fast as either signal lamp. Should one signal lamp burn out, lamp 50 will flash at half its rate, and will not flash at all if both lamps burn out. The pilot lamp thus acts as a check on the condition of the signal lamps.

Figure 3:
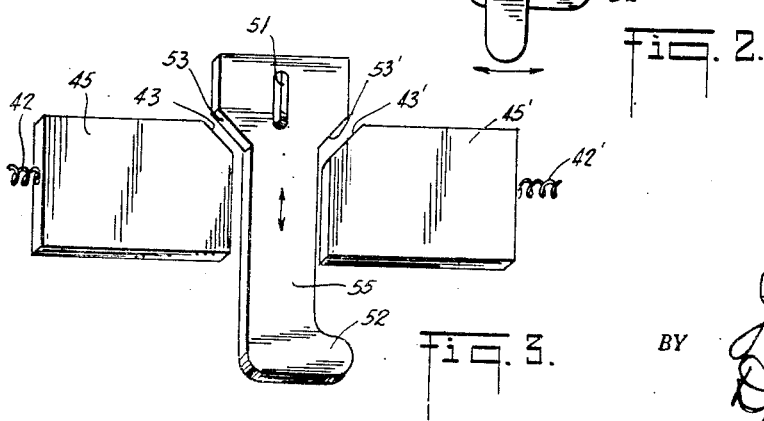
Fig. 3 is a perspective view of a pull handle to illuminate all the lamps at one time.

As shown more particularly in Figs. 2 and 3, the switch includes pull handle 55 having a slot 51 receiving the pivot pin 44 of lever 40, and having a finger hook 52. Pull handle 55 is guided by the slides, 45, 45', and has bevelled shoulders 53, 53' engageable with chamfered surfaces 43, 43' of the slides. When handle 55 is pulled, both slides are moved outwardly to flash all the signal lamps. This is of advantage for emergency parking, such as necessitated by motor or tire trouble. Suitable means, such as shoulders and grooves, or the like, are provided to guide the slides, these means being omitted from the illustrations for simplicity.

Fig. 6 shows the invention arrangement using the vehicle parking and stop lamps for signalling. Two extra pairs of inner terminals 17, 18 and 17', 18' are provided. Terminals 17, 17' are connected to intermediate terminals 12, 12' by contact strips 46, 46' in the off position of the switch. Similarly, terminals 18, 18' are connected to intermediate terminals 14, 14' by strips 47, 47'. Terminals 17, 17' are connected in parallel to the parking lamp tap of the headlamp control switch 56, and terminals 18, 18' are connected in parallel to the stop light operating switch 57. Left front parking lamp 60 is connected to 12, and right front parking lamp 60 is connected to 12'. Left stop lamp 65 is connected to terminal 14, and right stop lamp 65' to terminal 14'.

Two pilot lamps 50 and 50' are provided, one for each direction of operation of the switch. Each pilot lamp has one terminal solidly connected to an outer terminal 13, 13' and its other terminal connected to an auxiliary terminal 16, 16' each located adjacent to but slightly spaced from the other outer terminal 11, 11'. The contact strips 46, 46' will electrically connect auxiliary terminals 16 or 16' to outer terminal 11 or 11' and intermediate terminal 12 or 12', while contact strips 47, 47' will electrically connect terminals 13, 13' to 14, 14'. Thereby, the pilot lamps 50, 50' are selectively energized in accordance with the selective operation of the switch.

In the switch position shown in Fig. 6, the parking and stop lamps are connected by the switch for normal operation. When handle 40 is moved for a left turn lamp 60 is connected to contact 11 and lamp 65 to contact 13, for alternate flashing in the manner previously described, and pilot lamp 50 is connected across the outer and intermediate terminals. If pull handle 55 is pulled, both parking lamps, both stop lamps, and both pilot lamps are flashed in the same manner as described for signal lamps 30, 35.

When the switch 10 is in the turn signalling position, the parking lamp and stop lamps on one side of the vehicle are under the control of switch 10, and cannot be operated by switch 56 or 57. When handle 55 is pulled, neither pair of lamps can be controlled by switch 56 or 57.

In the arrangement of Fig. 7, terminals 11 and 13 are connected to flasher terminals 21 and 26, respectively, in the same manner as previously described, either the single pilot lamp arrangement of Fig. 1 or the double pilot lamp arrangement of Fig. 6 being used. However, in this case, terminal 11 is connected to terminal 13', rather than to terminal 11'. Similarly, terminal 13 is connected to terminal 11' rather than to terminal 13'.

If handle 55 is pulled to operate both slides, the left front and right rear lamps will be lighted immediately. As the flasher arm 25 swings to disengage contact 21 and engage contact 26, the right front and left rear lamps are lighted, the left front and right rear lamps being extinguished. This provides a "wig-wag" signalling effect at the front and rear of the vehicle. When handle 40 is selectively operated, only the front and rear lamps on one side of the vehicle are alternately flashed.

While specific embodiments of the invention have been shown and described in detail to illustrate the application of the invention principles thereof, it should be understood that the invention may be otherwise embodied without departing from such principles.

What is claimed is:

1. A motor vehicle directional switch comprising, in combination, a base having a pair of outer terminals and a pair of inner terminals, an operating lever mounted on said base between the inner terminals, a pair of slides movably mounted on the base on either side of said lever, and disconnected therefrom and each carrying a pair of contact strips each aligned with an outer terminal and an inner terminal, means biasing said slides to engage said lever with said strips engaging only the inner terminals, means limiting movement of said slides inwardly toward each other, said lever being selectively operable to move a slide outwardly to electrically interconnect an outer and inner terminal by a contact strip.

2. A motor vehicle directional switch comprising, in combination, a base having outer terminals and inner terminals, an operating lever pivotally mounted on said base between the inner terminals and having an abutment on each side thereof, a pair of slides movably mounted on the base on either side of said lever, and disconnected therefrom, and each carrying contact strips each aligned with an outer terminal and an inner terminal, means biasing said slides to engage the abutments of said lever with said strips engaging only the inner terminals, means limiting movement of said slides inwardly toward each other, said lever being selectively swingable to move a slide outwardly to electrically interconnect an outer and inner terminal by a contact strip.

3. A motor vehicle directional switch arrangement comprising, in combination, a selector switch having a base with a first pair of terminals and a second pair of terminals and means, including contact elements and an operating device, selectively operable to connect each terminal of the second pair to a different terminal of the first pair, a reciprocating switch including a first contact and a second contact and means operable to connect each of said first and second contacts alternately to a source of potential, and means connecting one terminal of said first pair to said first contact and the other terminal of said first pair to said second contact.

4. A motor vehicle directional switch arrangement comprising, in combination, a pair of grounded low resistance signal lamps, a selector switch having a base with a first pair of terminals and a second pair of terminals and means, including contact elements and an operating device, selectively operable to connect each terminal of the second pair to a different terminal of the first pair, means connecting each terminal of the second pair to a different grounded low resistance signal lamp, a high resistance pilot lamp connected across the first pair of terminals, a reciprocating switch including a first contact and a second contact and means operable to connect each of said first and second contacts alternately to a source of potential, and means connecting one terminal of said first pair to said first contact and the other terminal of said first pair to said second contact, whereby, when said selector switch is operated, one signal lamp will be immediately illuminated and the signal lamps will be alternately flashed, the pilot lamp being flashed, each time the reciprocating switch connects the source of potential to a different contact, through a circuit grounded through the unlighted signal lamp.

5. A motor vehicle directional switch comprising, in combination, a base having two inner, two outer, and two intermediate pairs of terminals, an operating lever mounted on said base between the inner terminals, a pair of slides movably mounted on the base on either side of said lever and each carrying a pair of contact strips, each strip being aligned with an outer, inner and intermediate terminal, and means biasing said slides to engage said lever with said strips engaging only the inner terminals and intermediate terminals, said lever being selectively operable to move a slide outwardly to electrically interconnect an outer and intermediate terminal by a contact strip.

6. A motor vehicle directional switch comprising, in combination, a base having two inner, two outer, and two intermediate pairs of terminals, an operating lever mounted on said base between the inner terminals, a pair of slides movably mounted on the base on either side of said lever and each carrying a pair of contact strips, each strip being aligned with an outer, inner and intermediate terminal, means biasing said slides to engage said lever with said strips engaging only the inner terminals and intermediate terminals, said lever being selectively operable to move a slide outwardly to electrically interconnect an outer and intermediate terminal by a contact strip, each slide having a cam surface on its inner edge, and cam means movably mounted on said base and engageable simultaneously with both cam surfaces to move both slides outwardly.

7. A motor vehicle directional switch comprising, in combination, grounded parking and stop lamps, a head lamp control switch, a stop lamp switch, a base having two inner, two outer, and two intermediate pairs of terminals, a reciprocating switch including a first contact and a second contact and means operable to connect each of said first and second contacts alternately to a source of potential, means connecting one terminal of each outer pair to said first contact and the other terminal of each outer pair to said second contact, means connecting one terminal of each intermediate pair to the parking lamp tap of the conventional vehicle head lamp control switch, means connecting the other terminal of each inner pair to the conventional brake-operated stop lamp switch, means connecting one terminal of each intermediate pair to a different parking lamp, means connecting the other terminal of each intermediate pair to a different stop lamp, an operating lever mounted on said base between the inner terminals, a pair of slides movably mounted on the base on either side of said lever and each carrying a pair of contact strips, each strip being aligned with an outer, inner and intermediate terminal, and means biasing said slides to engage said lever with said strips engaging only the inner terminals and intermediate terminals to connect the parking lamps to the head lamp control switch and to stop lamp control switch, said lever being selectively operable to move a slide outwardly to electrically interconnect an outer and intermediate terminal by a contact strip to alternately illuminate the parking and stop lamps connected to the selected intermediate terminals, each slide having a cam surface on its inner edge, and cam means movably mounted on said base and engageable simultaneously with both cam surfaces to move both slides outwardly to alternately illuminate all the parking and stop lamps.

8. A motor vehicle directional switch arrangement comprising, in combination, two pairs of grounded low resistance signal lamps, a selector switch having a base with two pairs of outer terminals, two pairs of inner terminals, two auxiliary terminals each adjacent an outer terminal of a different pair and means, including contact elements and an operating device, selectively operable to connect each terminal of a selected outer pair to a different terminal of an intermediate pair and to connect the selected auxiliary terminal to its adjacent outer terminal, means connecting each intermediate terminal to a different grounded low resistance signal lamp, a pair of high resistance pilot lamps each connected between an auxiliary terminal and the other outer terminal of the adjacent pair, a reciprocating switch including a first contact and a second contact and means operable to connect each of said first and second contacts alternately to a source of potential, and means connecting one terminal of each outer pair to said first contact and the other terminal of each outer pair to said second contact, whereby, when said switch is operated, one signal lamp connected to the associated intermediate terminals will be immediately illuminated and both signal lamps will be alternately flashed, the selected pilot lamp being flashed, each time the reciprocating switch connects the source of potential to a different contact, through a circuit grounded through the unlighted signal lamp.

9. A motor vehicle directional switch arrangement comprising, in combination, two pairs of grounded low resistance signal lamps, a selector switch having two pairs of outer terminals and two pairs of intermediate terminals with each pair including a front terminal and a rear terminal, means, including contact elements and a first operating device, selectively operable to simultaneously connect each terminal of a selected outer pair to the corresponding front or rear terminal of the adjacent intermediate pair, means, including the contact elements and a second operating device, selectively operable to simultaneously connect each terminal of both outer pairs to the corresponding terminal of the adjacent intermediate pairs, and a pair of conductors each respectively connecting a front terminal of one outer pair to the rear terminal of the other outer pair, means connecting each intermediate terminal to a different grounded low resistance signal lamp, the lamps being in pairs at either side of the front and rear of the vehicle, a reciprocating switch including a first contact and a second contact and means operable to connect each of said first and second contacts alternately to a source of potential, and means connecting one terminal of one outer pair to said first contact and the other terminal of such one outer pair of said second contact, whereby, when said first operating device is selectively operated, one signal lamp on a selected side of the vehicle will be immediately illuminated and both signal lamps on the selected side will be alternately flashed, and when said second operating device is operated, the left lamp on one end of the vehicle and the right lamp on the other end will be immediately illuminated and then flashed in alternation with the right lamp on such one end and the left lamp on such other end.

10. A motor vehicle directional switch arrangement comprising, in combination, two pairs of grounded low resistance signal lamps, a selector switch having two pairs of outer terminals and two pairs of intermediate terminals with each pair including a front terminal and a rear terminal, means, including contact elements and a first operating device, selectively operable to simultaneously connect each terminal of a selected outer pair to the corresponding front or rear terminal of the adjacent intermediate pair, means, including the contact elements and a second operating device, selectively operable to simultaneously connect each terminal of both outer pairs to the correspond terminal of the adjacent intermediate pairs, and a pair of conductors each respectively connecting a front terminal of one outer pair to the rear terminal of the other outer pair, means connecting each intermediate terminal to a different grounded low resistance signal lamp, the lamps being in pairs at either side of the front and rear of the vehicle, a reciprocating switch including a first contact and a second contact and means operable to connect each of said first and second contacts alternately to a source of potential, means connecting one terminal of one outer pair to said first contact and the other terminal of such one outer pair to said second contact, whereby, when said first operating device is selectively operated, one signal lamp on a selected side of the vehicle will be immediately illuminated and both signal lamps on the selected side will be alternately flashed, and when said second operating device is operated, the left lamp on one end of the vehicle and the right lamp on the other end will be immediately illuminated and then flashed in alternation with the right lamp on such one end and the left lamp on such other end, a high resistance pilot lamp connected across one pair of outer terminals, the pilot lamp being flashed, each time the reciprocating switch connects the source of potential to a different contact, through a circuit grounded through at least one unlighted signal lamp.

References Cited in the file of this patent

UNITED STATES PATENTS

| | | |
|---|---|---|
| 1,717,629 | Sawyer | June 18, 1929 |
| 1,905,934 | Haeussler | Apr. 25, 1933 |
| 2,086,959 | Rom | July 13, 1937 |
| 2,122,508 | Bell | July 5, 1938 |
| 2,238,394 | Murray | Apr. 15, 1941 |
| 2,258,747 | Doane | Oct. 14, 1941 |
| 2,300,896 | Hosmer | Nov. 3, 1942 |
| 2,358,332 | Kennett | Sept. 12, 1944 |
| 2,602,849 | Lawson | July 8, 1952 |
| 2,654,079 | Ringwald | Sept. 29, 1953 |